Dec. 20, 1955  P. D. WELLS  2,727,707
FISHING OUTRIGGER
Filed Aug. 22, 1952

INVENTOR.
PAUL D. WELLS
BY J. N. Adams

ATTORNEY

United States Patent Office 2,727,707
Patented Dec. 20, 1955

2,727,707

FISHING OUTRIGGER

Paul D. Wells, Oakland, Calif.

Application August 22, 1952, Serial No. 305,885

1 Claim. (Cl. 248—42)

This invention relates to a fishing outrigger, which is a device used in connection with fishing boats, generally in deep sea fishing. It is separate and apart from the rod used by a fisherman on the boat, but functions to keep the fisherman's line, when he has no fish on the line, far enough out from the side of the boat that the line does not trail in the wake of the boat. To keep the line thus out from the boat generally requires the use of a long and somewhat heavy pole, usually called a trolling pole, which extends outwardly from the side of the boat and which has a device at the end of said pole to which the line extends from the fisherman's rod and which temporarily holds the line until a fish takes the bait or lure on the end of the line and jerks the line free from said device. From that moment on the fisherman on the boat has control of the line through his rod and reel. More particularly the term "fishing outrigger" relates to apparatus secured to the boat for holding or carrying the aforesaid trolling pole.

Arrangements heretofore used for such trolling poles have been attended with several disadvantages and handicaps. One practice has been to secure the pole in a fixed or rigid position whereby it extends outwardly from the side of the boat more or less in a plane at right angle to the longitudinal axis of the boat, such as by having the butt of the pole secured in some manner on or near the deck of the boat and then clamping the pole at the point where it extends over the boat's gunwale. Another practice has been to hinge a carrier for the pole to some part of the boat so that it and the pole it carries can swing outwardly away from the side of the boat. Resort has also been had to apparatus including a ball joint at the butt of the pole carrier. Most, if not all, of such arrangements create the problem, when the boat goes under a bridge or otherwise passes near an object of some height above the water, of having to take the pole down and lay it on the deck alongside the cabin to afford clearance while the boat is passing the said object. And invariably they have been awkward and unhandy to operate, requiring a considerable amount of manipulation which in turn required the person who operated the device to be on the deck of the boat in the vicinity of the device in order to manipulate it. In times of rainy or stormy weather this often proves to be a great disadvantage.

It is an object of this invention to provide an adjustable fishing outrigger whereby the trolling pole, upon being placed in normal position for holding the fishing line clear of the wake of the boat, can be readily moved so as to clear an object the boat may be passing without having to take the pole down from its supporting apparatus.

It is another object of the invention to provide a fishing outrigger whereby the trolling pole can be easily and readily moved from its normal working position to a position alongside the cabin of the boat in rainy or stormy weather by an operator positioned within the cabin of the boat without having to go out upon the boat's deck to effect said adjustment.

These and other objects and advantages of my invention will be seen from the following description and from the attached drawings which illustrate a preferred form of the invention, and in which drawings Fig. 1 is a side elevation showing the fishing outrigger attached to the starboard side of the cabin of a boat, with the outrigger in position at right angle to the wall of the cabin (and therefore at right angle, approximately, to the longitudinal axis of the boat). The view is therefore that seen from the forward end of the deck and looking in a rearward direction.

Figure 1:
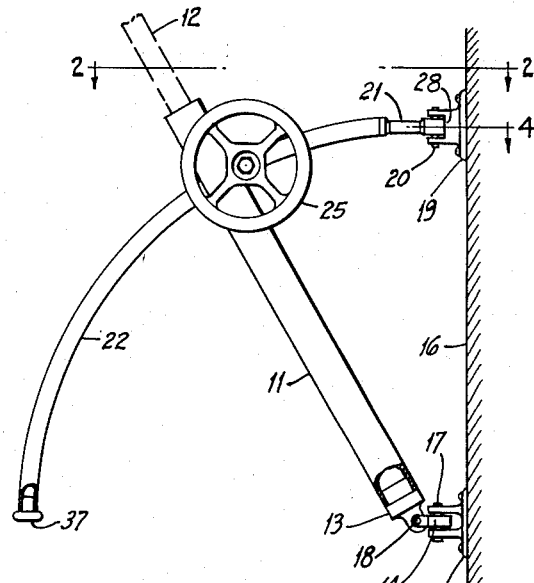

Referring to the drawings, reference numeral 11 is a pipe or other suitable hollow member in which the butt end of trolling pole 12 is inserted and which acts as a carrying member for said trolling pole. The lower end of pipe 11 is threaded or otherwise secured (as by welding or brazing) to a base piece 13 which is hinged to the member 14. A base plate 15 is suitably secured to a vertical surface 16, preferably the outer face of the side wall of the boat's cabin, and serves as the lower hinge member to which the aforesaid member 14 is rotatably mounted so as to turn about a vertical axis. This is accomplished by securing a vertical pin 17 in the two horizontally positioned lugs or projections of base plate hinge member 15, said pin, intermediate the said two projections, passing through a hole drilled in the member 14. The base piece 13 of pipe 11 is hinged so as to turn about a horizontal axis in the outer end of member 14, as by being rotatably mounted upon a horizontal pin 18 carried by the member 14. Thus a single universal joint connection is provided by members 13, 14 and 15 by which the pole holder 11 can be swung about a vertical axis and tilted up and down about a horizontal axis.

Figure 2:
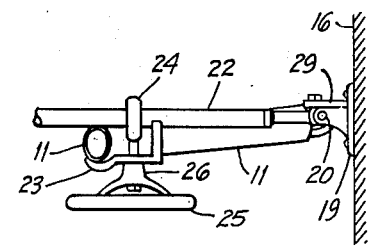
Fig. 2 is a top view of the device, taken along line 2—2 of Fig. 1.

Also suitably secured to the vertical surface 16 is an upper base plate hinge member 19. This hinge member is somewhat dissimilar to base plate hinge member 15, as will be hereinafter explained, but it is similar thereto in that it carries a pin 20 secured between its two horizontally positioned lugs or projections in the same manner as pin 17 is carried by lower base plate hinge member 15. The upper base plate hinge member is positioned with its pin 20 coaxial with pin 17 of the lower base plate hinge member and far enough above the lower base plate hinge member that the distance between the middle points of the two hinge members is somewhat less than the length of the pole-holding member 11 and its base member 13. Hinged upon pin 20 so as to turn freely about a vertical axis is member 21, to which is secured one end of an approximately arc-shaped arm 22. The base member 13 of pole holder 11 is loosely fitted about pin 18, so as to permit sufficient lateral movement of the outer end of pole holder 11 that the latter can make tangential contact with the arm 22, as seen in Fig. 2. It will thus be seen that by reason of its hinged connection at pin 18 the pole-holder 11 can be brought into tangential contact at all points along substantially the entire length of the arc-shaped arm 22 and that the pole holder and the arm when thus in contact with each other can be swung as a unit about their vertical axis.

Figure 3:
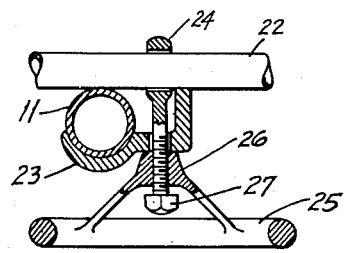
Fig. 3 is a section through the locking wheel of the device.

The pole-holding member 11 is held secure against arm 22 by yoke 23 (Figs. 2 and 3), one end of which is saddled upon, so as to rest against, pole-holder 11 and the other end is saddled upon and rests against arm 22. The ring part of eye bolt 24 fits loosely around arm 22 and the stem of said eye bolt extends through a hole in yoke 23 intermediate its clamping or saddling ends. By turning the hand wheel 25, the hub 26 of which is in threaded engagement with the eye-bolt stem, the hub 26 of said hand wheel is brought to bear upon yoke 23 so as to hold the pole-holder 11 firmly against arm 22 for any desired angle at which the pole-holder is tilted. Similarly, the hand wheel can be turned so as to release the pressure of the yoke, thereby permitting the pole-holder to be moved to a new position of contact along the arm 22. To prevent the hand wheel from being turned completely off and falling or otherwise escaping, a cap 27 is suitably secured on the end of the stem of the eyebolt.

Figure 5:
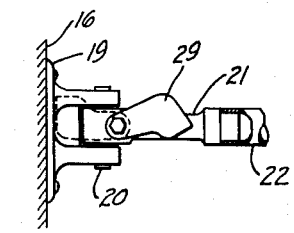
Fig. 5 is a rear elevation view of the upper hinge of Fig. 1, showing the locking dog in opened position (and closed position in dotted line).
Figure 4:
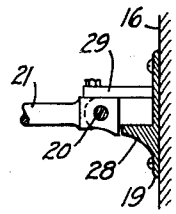
Fig. 4 shows a section through the upper hinge on line 4—4 of Fig. 1.
Figure 7:
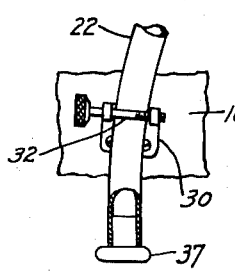
Figs. 7 and 8 show front and side views, respectively, of a clamp for holding the outrigger against the wall of the boat cabin.
Figure 8:
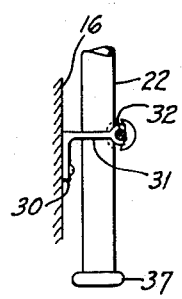

When the fishing outrigger is in use to hold the pole, which is carried by pole holder 11 so that it will extend outwardly from the side of the boat, the outrigger is locked in a position at right angle to the wall of the cabin or other vertical surface on which it is mounted. To prevent the device from being swung past the said right angle position, that portion of the end surface of member 21 which is forward of the longitudinal axis of said member is made to butt squarely against a wall 28 which extends outwardly, in a vertical plane, between the two horizontally positioned pin-carrying projections or lugs of base plate 19, from the face of said base plate. This wall 28 is shown in section in Fig. 4 and in side view in Fig. 1. To hold the outrigger in the said right angle position and prevent its swinging back toward the face or wall of the cabin, locking dog 29 is rotatably mounted upon the rearward side of member 21 so as to permit its being swung about a horizontal axis. In its locking position the outer end-face of said dog fits securely against the face of base plate 19, as shown by the dotted lines in Fig. 5. An edge view of this locking dog, in its locking position, is shown in Fig. 2 and Fig. 4. In Fig. 5 the locking dog 29 is shown in its opened position. This locking dog is easily moved from its locking position to the opened position, a slight pressure exerted by one's thumb or finger being sufficient to release the locking dog so that the rigger can be swung back from its working position at right angle to the boat to a position along the wall of the cabin. In order that it may be held along side the cabin wall the clamp arrangement shown in Figs. 7 and 8 is provided, this clamp 30 being suitably secured to the side of the cabin wall 16 or other suitable surface so that the arm 22 may be moved to a position between the two projections 31 of said clamp and held therein by the bolt 32 which passes through a hole in one of said projections and has threaded engagement with the other of said projections. If desired, when the arm 22 consists of a pipe, the free end thereof may be closed by a suitable cap or plug 37 suitably secured to the end of said arm.

Figure 6:
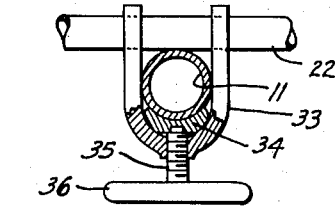
Fig. 6 shows a locking device which could serve as an alternate to the device shown in Fig. 3.

Different means than that shown may be employed for holding the rigger alongside the cabin wall when not in use, for securing the rigger in its working position at right angle to the boat or in other suitable working position, and for clamping the pole-holder 11 firmly against the arm 22. In Fig. 6 there is shown an alternate device for clamping the pole-holder firmly in any tilted position along the arm 22. Clevis 33 is positioned around the pole-holder 11 with arm 22 extending through the eyes of said clevis. A saddle piece 34 adjacent the U bend in the clevis fits over the pole-holder and a bolt 35 provided with a turning wheel 36 is in threaded engagement with the clevis 33 so that by turning the bolt down against the saddle piece 34 the arm 22 is drawn firmly against the pole-holder 11.

It will be understood that the examples of construction and application of my invention given hereinabove are exemplary in nature, that various changes and modifications may be made thereto without departing from the spirit of the invention, and that there is comprehended within the invention such modifications as come within the scope of the following claim.

I claim:

A fishing rod outrigger holder adapted to be mounted upon a flat vertical surface to swing backwardly against said surface, comprising a lower bracket, a socket connected at its lower end to said bracket to be movable about a horizontal and a vertical axis, an upper bracket spaced from said lower bracket, an arcuate member unsupported at its lower end and with its upper end pivotally connected to said upper bracket to be movable in a horizontal arc extending rearwardly of said bracket, clamping means for connecting said socket at a desired point on said arcuate member, and a movable latch at the upper end of said arcuate member ot selectively engage said upper bracket and lock said pivotal connection and said arcuate member substantially at a right angle to said surface.

References Cited in the file of this patent
UNITED STATES PATENTS

| | | |
|---|---|---|
| 492,433 | Rhone | Feb. 28, 1893 |
| 760,534 | Grove | May 24, 1904 |
| 1,152,100 | Kaufmann et al. | Aug. 31, 1915 |
| 1,228,583 | Mueller | June 5, 1917 |
| 2,545,777 | Hardin | Mar. 20, 1951 |